United States Patent [19]

Engeler et al.

[11] Patent Number: 5,345,939

[45] Date of Patent: Sep. 13, 1994

[54] ULTRASOUND IMAGING SYSTEM WITH DYNAMIC WINDOW FUNCTION

[75] Inventors: William E. Engeler, Scotia; Christopher M. W. Daft, Schenectady, both of N.Y.; John T. Pedicone, Brookfield; Theodore L. Rhyne, Whitefish Bay, both of Wis.

[73] Assignee: General Electric Company, Schenectady, N.Y.

[21] Appl. No.: 157,760

[22] Filed: Nov. 24, 1993

[51] Int. Cl.⁵ ............................................. A61B 8/00
[52] U.S. Cl. ............................... 128/661.01; 73/602
[58] Field of Search ............. 128/660.01, 666.06, 128/666.07, 660.08, 661.01; 73/602; 250/560, 561

[56] References Cited

U.S. PATENT DOCUMENTS

| | | | |
|---|---|---|---|
| 4,499,383 | 2/1985 | Loose | 250/561 |
| 4,852,576 | 8/1989 | Inbar et al. | 128/660.06 |
| 5,111,695 | 5/1992 | Engeler et al. | 128/661.01 |

*Primary Examiner*—George Manuel
*Attorney, Agent, or Firm*—Marvin Snyder

[57] ABSTRACT

A PASS ultrasonic system includes a separate receive channel for each respective element in an ultrasonic transducer array which imparts a delay to the echo signal produced by each respective element. The delayed echo signals are summed to form a steered, dynamically focused and dynamically windowed receive beam which can be readily interpreted even when the transmit beam does not emanate from the center of the array.

8 Claims, 10 Drawing Sheets

| REGION | TIME | A | B | C | ADDRESS | S | L | SOLUTION |
|---|---|---|---|---|---|---|---|---|
| 1A, 1B, 1C | $n=n_s$ | $M$ | $n_o$ | 0 | $M$ | $\log_2 \frac{M}{n_o+1}$ | 1 | $M\frac{n_o}{n}$ |
| 2A | $n=n_e$ | $M\frac{n_e-n_o}{n_e}$ | $2n_e$ | 0 | $M\left(1-\frac{n_e-n_o}{n_e}\right)$ | $\log_2 \frac{M}{2n_e+1}$ | -1 | $M\left\|\frac{2(n_e-n_o)}{n_e+n}-1\right\|$ |
| 2B, 2C | $n=n_e$ | $M\frac{n_e+n_o}{n_e}$ | $2n_e$ | 0 | $M\left(1-\frac{n_e-n_o}{n_e}\right)$ | $\log_2 \frac{M}{2n_e+1}$ | -1 | $M\left\|\frac{2(n_e+n_o)}{n_e+n}-1\right\|$ |
| 3C | $n=n_0$ | $2M$ | $n_e+n_0$ | 0 | $M$ | $\log_2 \frac{2M}{n_e+n_0+1}$ | 1 | $M\left\|\frac{2(n_e+n_o)}{n_e+n}-1\right\|$ |
| 4A | $n=n_m$ | $M\frac{2n_o+(n_m-n_e)}{n_m+n_e}$ | $n_m+n_e$ | 0 | $M\frac{\|2n_o+n_m-n_e\|}{n_m+n_e}$ | $\log_2 \frac{\|2n_o+n_m-n_e\|}{(n_m+n_e)(n_m+n_e+1)}$ | 1 | $M\left\|\frac{2n_o+(n_m-n_e)}{2n+(n_e-n_m)}\right\|$ |
| AB, 4C | $n=n_m$ | $M\frac{2n_o-(n_m-n_e)}{n_m+n_e}$ | $n_m+n_e$ | 0 | $M\frac{\|2n_o-n_m-n_e\|}{n_m+n_e}$ | $\log_2 \frac{\|2n_o-(n_m-n_e)\|}{(n_m+n_e)(n_m+n_e+1)}$ | 1 | $M\left\|\frac{2n_o-(n_m-n_e)}{2n+(n_e-n_m)}\right\|$ | fig. 11

ULTRASOUND IMAGING SYSTEM WITH DYNAMIC WINDOW FUNCTION

BACKGROUND OF THE INVENTION

This invention relates to vibratory energy imaging and, in particular, phased array vibratory energy (e.g. ultrasound) imaging systems with dynamic windowing.

There are a number of modes in which vibratory energy, such as ultrasound, can be used to produce images of objects. The ultrasound transmitter may be placed on one side of the object and the sound transmitted through the object to the ultrasound receiver placed on the other side ("transmission mode"). With transmission mode methods, an image may be produced in which the brightness of each pixel is a function of the amplitude of the ultrasound that reaches the receiver ("attenuation" mode), or the brightness of each pixel is a function of the time required for the sound to reach the receiver ("time-of-flight" or "speed of sound" mode). In the alternative, the receiver may be positioned on the same side of the object as the transmitter and an image may be produced in which the brightness of each pixel is a function of the amplitude of the ultrasound reflected from the object back to the receiver ("refraction", "backscatter" or "echo" mode). The present invention relates to a backscatter method for producing ultrasound images.

There are a number of well known backscatter methods for acquiring ultrasound data. In the original "A-scan" method, an ultrasound pulse is directed into the object by the transducer and the amplitude of the reflected sound is recorded over a period of time. The amplitude of the echo signal is proportional to the scattering strength of the reflectors (or "refractors") in the object and the time delay is proportional to the range of the refractors from the transducer. In the original so-called "B-scan" method, the transducer transmits a series of ultrasonic pulses as it is scanned across the object along a single axis of motion. The resulting echo signals are recorded as with the A-scan method and their amplitude can be used to modulate the brightness of pixels on a display. With the B-scan method, enough data are acquired from which an image of the refractors can be reconstructed.

In the so-called C-scan method, the transducer is scanned across a plane above the object and only the echoes reflecting from the focal depth of the transducer are recorded. The sweep of the electron beam of a CRT display is synchronized to the scanning of the transducer so that the x and y coordinates of the transducer correspond to the x and y coordinates of the image.

Ultrasonic transducers for medical applications are constructed from one or more piezoelectric elements sandwiched between a pair of electrodes. Such piezoelectric elements are typically constructed of lead zirconate titanate (PZT), polyvinylidene difluoride (PVDF), or PZT ceramic/polymer composite. The electrodes are connected to a voltage source, and when a voltage waveform is applied, the piezoelectric elements change in size at a frequency corresponding to that of the applied voltage. When a voltage waveform is applied, the piezoelectric element emits an ultrasonic wave into the media to which it is coupled at the frequencies contained in the excitation waveform. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is coupled to the rear of the piezoelectric element to absorb ultrasonic waves that emerge from the back side of the element so that they do not interfere. A number of such ultrasonic transducer constructions are disclosed in U.S. Pat. Nos. 4,217,684; 4,425,525; 4,441,503; 4,470,305 and 4,569,231, all of which are assigned to the instant assignee.

When used for ultrasound imaging, the transducer typically has a number of piezoelectric elements arranged in an array and driven with separate voltages (apodizing). By controlling the time delays (or phase) and amplitude of the applied voltages, the ultrasonic waves produced by the piezoelectric elements (transmission mode) combine to produce a net ultrasonic wave that travels along a preferred beam direction and is focused at a selected point along the beam. By controlling the time delays and amplitude of successive applications of the applied voltages, the beam with its focal point can be moved in a plane to scan the subject.

The same principles apply when the transducer is employed to receive the reflected sound (receiver mode). That is, the voltages produced at the transducer elements in the array are summed together such that the net signal is indicative of the sound reflected from a single focal point in the subject. As with the transmission mode, this focused reception of the ultrasonic energy is achieved by imparting separate time delays (and/or phase shifts) and gains to the signal from each transducer array element. In addition, to reduce side lobes in the receive beam the amplitude of each transducer element signal is modified in accordance with a window function prior to summation into the focused beam.

This form of ultrasonic imaging is referred to as "phased array sector scanning", or "PASS". Such a scan is comprised of a series of measurements in which the steered ultrasonic wave is transmitted, the system switches to receive mode after a short time interval, and the reflected ultrasonic wave is received and stored. Typically, the transmission and reception are steered in the same direction ($\theta$) during each measurement to acquire data from a series of points along an acoustic beam or scan line. The receiver is dynamically focused at a succession of ranges (R) along the scan line as the reflected ultrasonic waves are received. The time required to conduct the entire scan is a function of the time required to make each measurement and the number of measurements required to cover the entire region of interest at the desired resolution and signal-to-noise ratio. For example, a total of 128 scan lines may be acquired over a 90 degree sector, with each scan line being steered in increments of 0.70°. A number of such ultrasonic imaging systems are disclosed in commonly assigned U.S. Pat. Nos. 4,155,258; 4,155,260; 4,154,113; 4,155,259; 4,180,790; 5,111,695; 4,470,303; 4,662,223; 4,669,314 and 4,809,184 and described in an article by E. H. Karrer and A. M. Dickey entitled "Ultrasound Imaging: An Overview" *Hewlett-Packard Journal*, October 1983, pp. 3–6.

The time delay and phase shift applied to the signal received by each transducer array element in order to produce a perfectly steered and focused receive beam changes as the reflected ultrasonic wave is being received. In addition, the amplitude of each transducer element signal is modified in accordance with a window function which serves to reduce side lobes in the focused receive beam. This smooth, magnitude weighting window function is applied across the entire array of transducer elements which are actively receiving echo signals at any moment in time, and since the number of active transducer elements changes as a function of time, so does the application of the window function; that is, the magnitude weighting factor applied to the echo signal received by each transducer element in order to apply the smooth window function to the receive beam changes as a function of time and must be continuously recalculated during the receive process.

The calculation of the window function weighting factor for any transducer element is a relatively simple matter when a sector scan is performed and the beam is formed about the center of the transducer array. In this case the receive aperture of the array is opened at a uniform rate by progressively adding transducer element signals symmetrically on each side of the center element to the receive beam. This results in a uniform widening of the window function until all transducer elements are contributing to the receive beam. In this case, the center of the window function also remains positioned at the center of the transducer array.

However, when the array is operated in a linear scan, or offset sector scan mode, the calculation of the window function weighting factor becomes very complex. This is because these modes traditionally form beams with phase centers that move laterally along the length of the transducer array aiming at either $\theta = 0°$ or $\theta = 20°$. As a result, the window function will widen symmetrically about the beam origin or phase center (not the central axis of the array) during a first receive interval, and it will continue to widen at a different rate and not be centered about the beam origin during a second receive interval. The first receive interval ends when all the transducer elements to one side of the beam origin have been included in the receive aperture, and the second receive interval ends when all transducer elements to the other side have been included. Subsequently, the receive aperture is fully open and the window function is constantly applied over all the transducer elements to properly weight their signals.

SUMMARY OF THE INVENTION

Briefly, in accordance with a preferred embodiment of the invention, an improved method and apparatus for dynamically adjusting the window function weighting factors applied to each receive channel in an ultrasonic imaging system. More specifically, a digital receive channel control circuit is provided for storing in a memory a digital representation of a window function curve and which includes a circuit for dynamically calculating an address that is applied to the memory to read out of the memory a window weighting factor for an echo signal being processed by the receive channel. The dynamic calculating circuit produces a continuous solution during receipt of an echo signal by the receive channel as the receive aperture opens through three stages: a first symmetric opening stage; a second asymmetric opening stage; and a third fully open stage.

A general object of the invention is to provide for each receive channel a window weighting factor that is dynamically changed during receipt of an echo signal by a digital circuit. This enables the circuit to be included as part of a digital integrated circuit along with other digital receive channel circuits.

Another object of the invention is to provide dynamic window weighting factors for each transducer element echo signal in an array which produces a beam that emanates from any position in the array. When the beam center emanates from a location other than the physical center of the transducer array, the window function opens with the receive aperture in three distinct stages. The dynamic calculating circuit of the invention determines when each of these stages applies and dynamically calculates the corresponding window weighting factor while in that stage.

A more specific object of the invention is to provide a dynamic, digital circuit which can be configured to apply different window functions to the receive beam, which is applicable to any transducer element in the array, and which will accommodate a beam emanating from any location in the array. The window function is stored in a memory and may be easily changed by downloading a new window function to each receive channel memory. Before each beam firing, initial conditions are also downloaded to each receive channel to configure the dynamic calculating circuit for that firing with a set of parameters. These parameters are determined in accordance with the location of the receive channel transducer in the array and in accordance with the location from which the beam center emanates.

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

BRIEF DESCRIPTION OF THE DRAWINGS

FIGS. 2A and 2B are graphical illustrations of the signal in any of the channels of the transmitter shown in FIG. 2;

FIG. 11 is a chart showing the parameters loaded into the dynamic window circuit of FIG. 6 during the different stages of receive aperture opening.

DESCRIPTION OF THE PREFERRED EMBODIMENT

Figure 1:
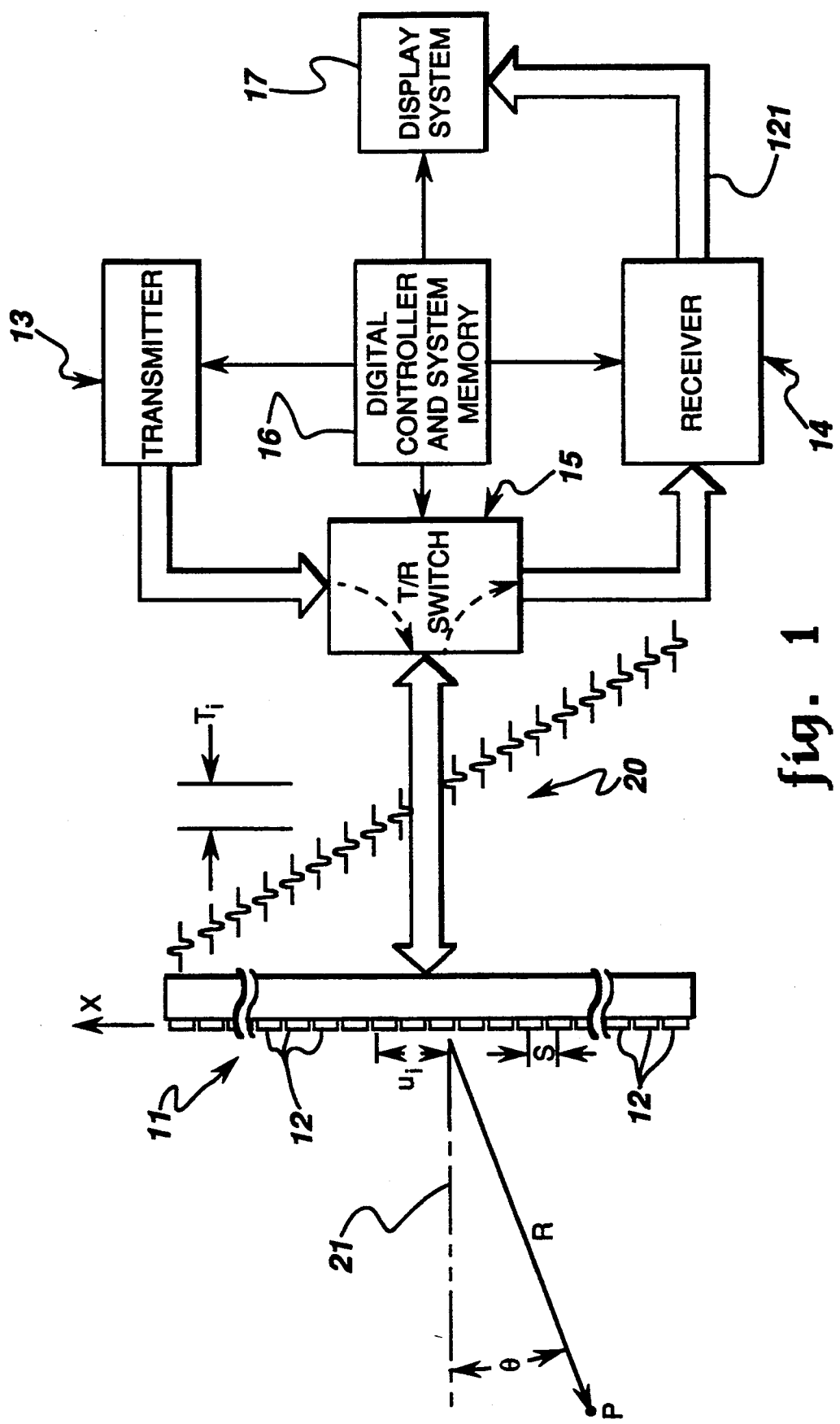
FIG. 1 is a block diagram of a vibratory energy imaging system which employs the present invention.

Referring particularly to FIG. 1, an ultrasonic imaging system includes a transducer array 11 comprised of a plurality of separately driven elements 12 which each produce a burst of ultrasonic energy when energized by a pulsed waveform produced by a transmitter 13. The ultrasonic energy reflected back to transducer array 11 from the subject under study is converted to an electrical signal by each transducer element 12 and applied separately to a receiver 14 through a set of transmit/-receive (T/R) switches 15. Transmitter 13, receiver 14 and switches 15 are operated under control of a digital controller and system memory 16 responsive to commands by a human operator. A complete scan is performed by acquiring a series of echoes in which switches 15 are set to the transmit position, transmitter 13 is gated on momentarily to energize each transducer element 12, switches 15 are then set to the receive position, and the subsequent echo signals produced by each transducer element 12 are applied to receiver 14. The separate echo signals from each transducer element 12 are combined in receiver 14 to produce a single echo signal which is employed to produce a line in an image on a display system 17.

Transmitter 13 drives transducer array 11 such that the ultrasonic energy produced is directed, or steered, in a beam. A B-scan can therefore be performed by moving this beam through a set of angles from point-to-point rather than physically moving transducer array 11. To accomplish this, transmitter 13 imparts a time delay ($T_i$) to the respective pulsed waveforms 20 that are applied to successive transducer elements 12. If the time delay is zero ($T_i=0$), all the transducer elements 12 are energized simultaneously and the resulting ultrasonic beam is directed along an axis 21 normal to the transducer face and originating from the center of transducer array 11 As the time delay ($T_i$) is increased as illustrated in FIG. 1, the ultrasonic beam is directed downward from central axis 21 by an angle $\theta$. The relationship between the time delay increment $T_i$ added successively to each $i^{th}$ signal from one end of the transducer array (i=1) to the other end (i=n) is given by the following relationship:

$$T_i = R_T/c - \sqrt{(R_T/c)^2 + (x/c)^2 + 2xR_T\sin\theta/c^2} \tag{1}$$

where:
x=distance of center of element i from the phase center of transducer array,
$\theta$=transmit beam angle,
c=velocity of sound in the object under study, and
$R_T$=range at which transmit beam is focused.

The time delays $T_i$ in equation (1) have the effect of steering the beam in the desired angle and causing it to be focused at a fixed range $R_T$. A sector scan is performed by progressively changing time delays $T_i$ in successive excitations. The angle $\theta$ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions (R) along the ultrasonic beam. These are sensed separately by each segment 12 of transducer array 11 and a sample of the magnitude of the echo signal at a particular point in time represents the amount of reflection occurring at a specific range (R). Due to differences in the propagation paths between a reflecting point P and each transducer element 12, however, these echo signals will not occur simultaneously and their amplitudes will not be equal. The function of receiver 14 is to amplify and demodulate these separate echo signals, impart the proper time delay and phase shift to each and sum them together to provide a single echo signal which accurately indicates the total ultrasonic energy reflected from point P located at range R along the ultrasonic beam oriented at angle $\theta$. As will be described in more detail below, it is also a function of receiver 14 to apply weighting factors to the separate echo signals such that a smooth window function is applied to suppress side lobe signals that would otherwise muddle the nicely focused receive beam.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles ($\theta$) is performed to provide the data necessary for display.

To coherently sum the electrical signals produced by the echoes received at each transducer element 12, time delays and phase shifts are introduced into each separate transducer element channel of receiver 14. The beam time delays for reception are the same delays ($T_i$) as the transmission delays described above. However, in order to dynamically focus the receive beam, the time delay and phase shift of each receiver channel is continuously changing during reception of the echo to provide dynamic focusing of the received beam at the range R from which the echo signal emanates. The equation for the time delay imposed on the signal received by each transducer element is:

$$T_d = t/2 - \sqrt{(t/2)^2 + (x/c)^2 - (xt/c)\sin(\theta)} \tag{2}$$

where:
t=elapsed time after sound is transmitted from the center of the transducer array (i.e. START),
c=velocity of sound in the object under study,
$\theta$=beam angle, and
x=distance of the center of a transducer element from the phase center of the transducer array.

The same calculation, suitably scaled, also provides the correct phase shift.

Under direction of digital controller 16, receiver 14 provides delays during the scan such that the steering of receiver 14 tracks with the direction of the beam steered by transmitter 13 and it samples the echo signals at a succession of ranges and provides the proper delays and phase shifts to dynamically focus at points P along the beam. Thus, each emission of an ultrasonic pulse waveform results in acquisition of a series of data points which represent the amount of reflected sound from a corresponding series of points P located along the ultrasonic beam.

Figure 7A:
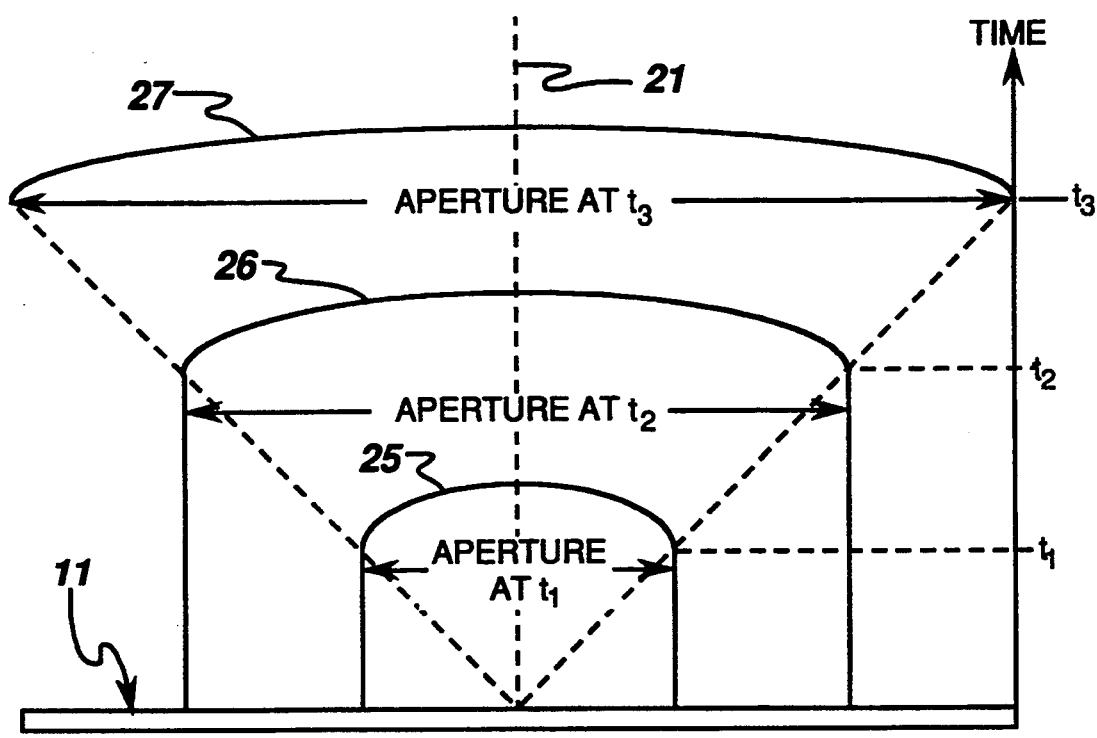
FIGS. 7A and 7B are graphical representations of the window function as the receive aperture opens for a centered and an off-center beam respectively.

For proper receive apodization the receive aperture is dynamically opened, beginning at the phase center of the transducer when the receiver is switched on, and widens as a function of time. For this operation, the number of transducer elements activated, and the size of the f stop selected, are design choices. A convenient choice for number of transducer elements is 128. In a preferred embodiment, an f stop F of "two" is provided, which means that at any moment during receipt of the echo signal, the effective width of the active array elements is one half the distance R to the dynamically changing focal point. The f stop may be defined as the ratio of active array length to the range R. The objective is to maintain the f number F constant as the receive aperture opens. Referring to FIG. 7A in conjunction with FIG. 1, this means that during reception of the echo signal only a few transducer elements 12 adjacent the central axis 21 are initially enabled (at time $t=t_1$) to contribute to the receive beam, but as time passes (time $t=t_2$) and the echo signal is received over longer ranges, the number of enabled receiver channels is increased to increase the receive aperture. Eventually (at time $t=t_3$) the aperture is fully open to include all 128 transducer array elements 12. With the beam phase center located at the center of transducer array 11, it can be seen in FIG. 7A that the receive aperture opens symmetrically about the central axis 21 at a uniform rate until it is fully open at 128 elements.

If the echo signal from each transducer element 12 within the currently active receive aperture is equally weighted ($w=1$), high side lobe levels are formed on the receive beam. This results from the physics of phased array systems, as known in the art, and it means that echo signals from locations to either side of the beam angle $\theta$ contribute to the focused beam signal produced by receiver 14. This contribution to the received signal makes it difficult to interpret the signal and is particularly troublesome for example, when images of narrow, low signal structures such as cysts are sought, and these structures are surrounded by highly reflective structures. With a uniformly weighted aperture, the receiver sensitivity pattern approximates a sinc waveform with its central lobe directed along the beam angle $\theta$ and its symmetrical side lobes directed to each side of the beam angle $\theta$.

Referring again to FIG. 7A, the solution to the above-described side lobe problem is to weight the signals from the separate transducer elements in the receive aperture in a non-uniform manner. Such aperture weighting factor is referred to in the art as a window function $W(\alpha)$. The system is capable of operating with any one of a variety of window functions, selected by design choice. The window function has a value of "1" at the center of the receive aperture, and it smoothly and symmetrically drops in value until it is a small value or zero at each end of the aperture. Such window function is illustrated in FIG. 7A by curve 25 for the aperture at time $t=t_1$, by the curve 26 at time $t=t_2$, and by the curve 27 at time $t=t_3$. When the beam is centered in the transducer array, as shown in FIG. 7A, the window function $W(\alpha)$ is stretched in width at a uniform rate determined by the rate at which the receive aperture is opened, and it remains symmetrical about the beam axis at all times. For any receiver channel therefore, the value of the window weighting factor which should be applied to the echo signal produced by its associated transducer element may be calculated.

Figure 7B:
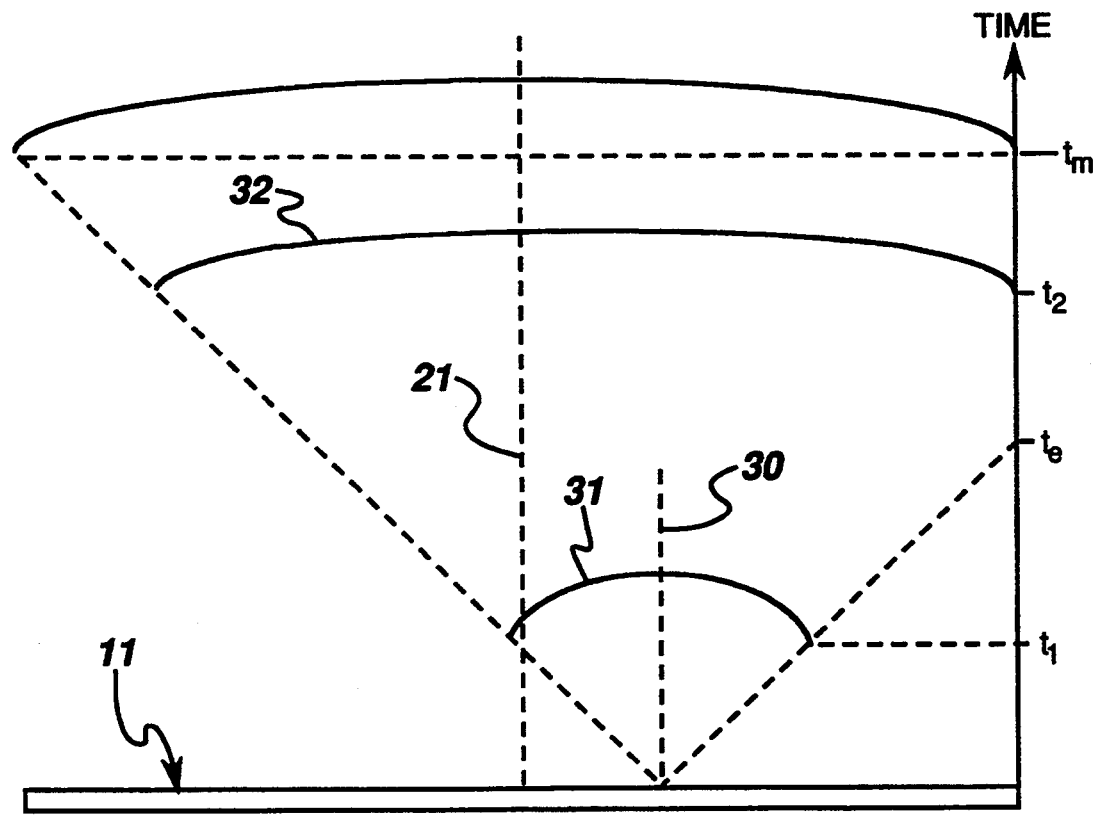

When the system is operated with a linear transducer array in which the beam center may not correspond to the center of transducer array 11, the calculation becomes more complex. Referring particularly to FIG. 7B, when a beam 30 does not emanate from the array center at central axis 21, the receive aperture opens in two stages. During the first stage, as indicated at time $t=t_1$, the receive aperture is symmetrical about the axis of beam 30 and the window function is also symmetrical as indicated by curve 32. This first stage continues until the receive aperture is opened to the point where the nearest end (the right-hand end in FIG. 7B) of the associated transducer 11 is reached at time $t=t_e$. When this occurs, a second stage begins in which the receive aperture continues to open, but only to one side of the beam axis (the left-hand side in FIG. 7B) and at one half the rate. As a result, a window function 32 at time $t=t_2$ is employed and is not as wide as the corresponding window function 26 in the centered beam of FIG. 7A nor is it symmetrical about the axis of beam 30. Eventually, of course, the receive aperture is fully opened at time $t=t_m$ and the resulting window function 33 is the same as the window function 27 for the centered beam of FIG. 7A. A primary objective of the present invention is to provide a window weighting factor for each of the receiver channels so as to produce the proper window function for the opening receive aperture. How this is done is discussed in more detail below.

Figure 2:
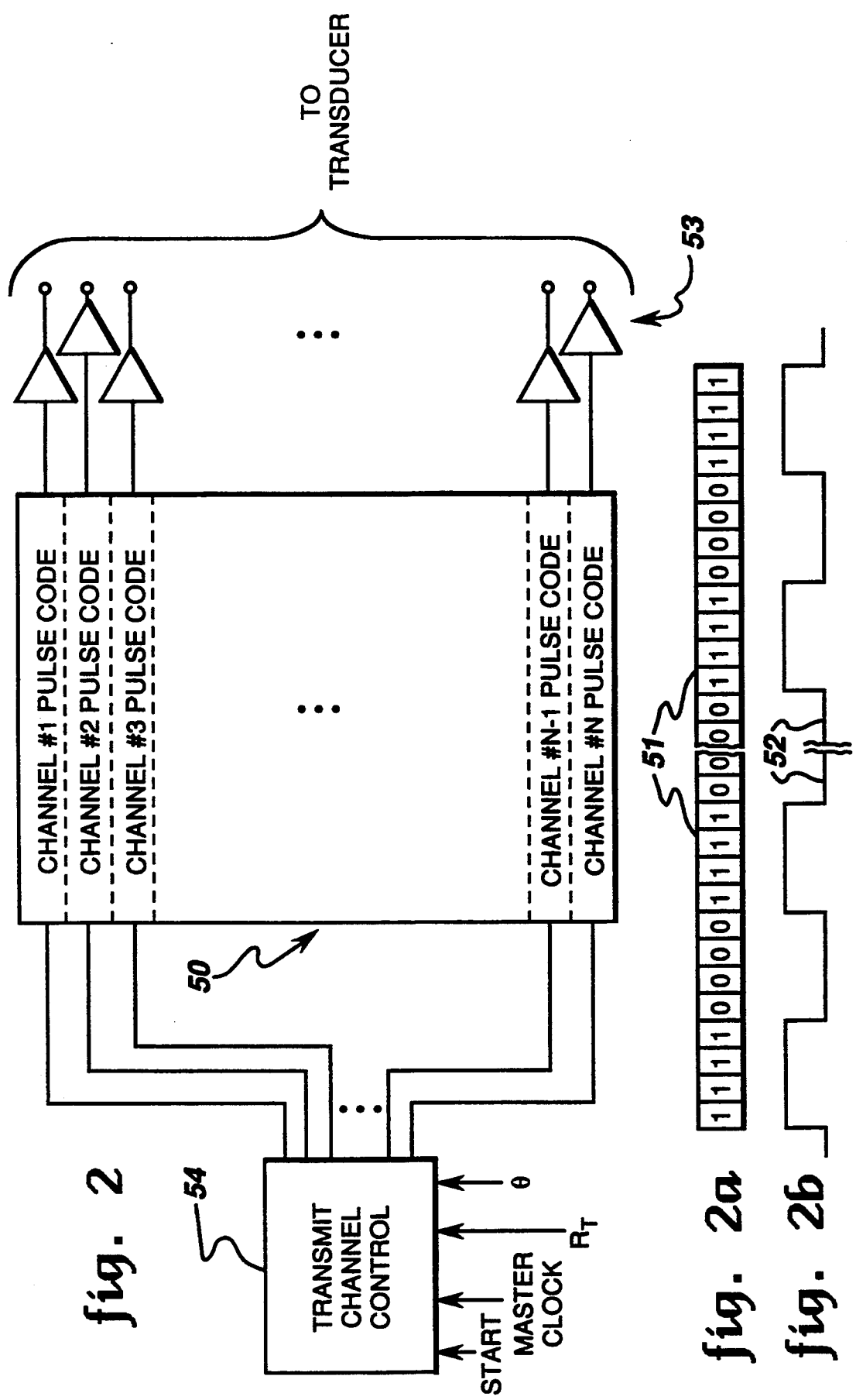
FIG. 2 is a block diagram of a transmitter which forms part of the system of FIG. 1.

Referring to FIG. 2 in conjunction with FIG. 1, transmitter 13 includes a set of channel pulse code memories which are indicated collectively as memories 50. In the preferred embodiment there are 128 separate transducer elements 12, and therefore, there are 128 separate channel pulse code memories 50. Each pulse code memory 50 is typically a 1-bit by 512-bit memory which stores a bit pattern 51 that determines the frequency of ultrasonic pulse 52 that is to be produced. In the preferred embodiment this bit pattern is read out of each pulse code memory 50 by a 40 MHz master clock and applied to a driver 53 which amplifies the signal to a power level suitable for driving the transducer 11. In the example shown in FIG. 2A, the bit pattern is a sequence of four "1" bits alternated with four "0" bits to produce a 5 MHz ultrasonic pulse 52, although other carrier frequencies ($F_0$) may alternatively be employed in the preferred embodiment, such as 2.5, 3.75, 6.25, 7.5, 8.75 and 10 MHz. The transducer elements 11 to which these ultrasonic pulses 52 are applied respond by producing ultrasonic energy.

As indicated above, to steer the transmitted beam of the ultrasonic energy in the desired direction ($\theta$), pulses 52 for each of the n channels must be delayed by the proper amount. These delays are provided by a transmit control 54 which receives four control signals (START MASTER CLOCK $R_T$ and $\theta$) from digital controller 16 (FIG. 1). Using the input control signal $\theta$, the fixed transmit focus $R_T$, and the above equation (1) transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, the 40 MHz MASTER CLOCK signal is gated through to the next channel pulse code memory 50 until all n=128 channels are producing their ultrasonic pulses 52. Each transmit channel 50 is reset after its entire bit pattern 51 has been transmitted and transmitter 13 then waits for the next $\theta$ and next START control signals from digital controller 16. As indicated above, in the preferred embodiment of the invention a complete B-scan is comprised of 128 ultrasonic pulses steered in $\Delta\theta$ increments of 0.70° through a 90° sector centered about the central axis 21 (FIG. 1) of transducer 11.

For a detailed description of transmitter 13, reference is made to commonly assigned U.S. Pat. No. 5,014,712 issued May 14, 1991 and entitled "Coded Excitation For Transmission Dynamic Focusing of Vibratory Energy Beam", incorporated herein by reference.

Figure 3:
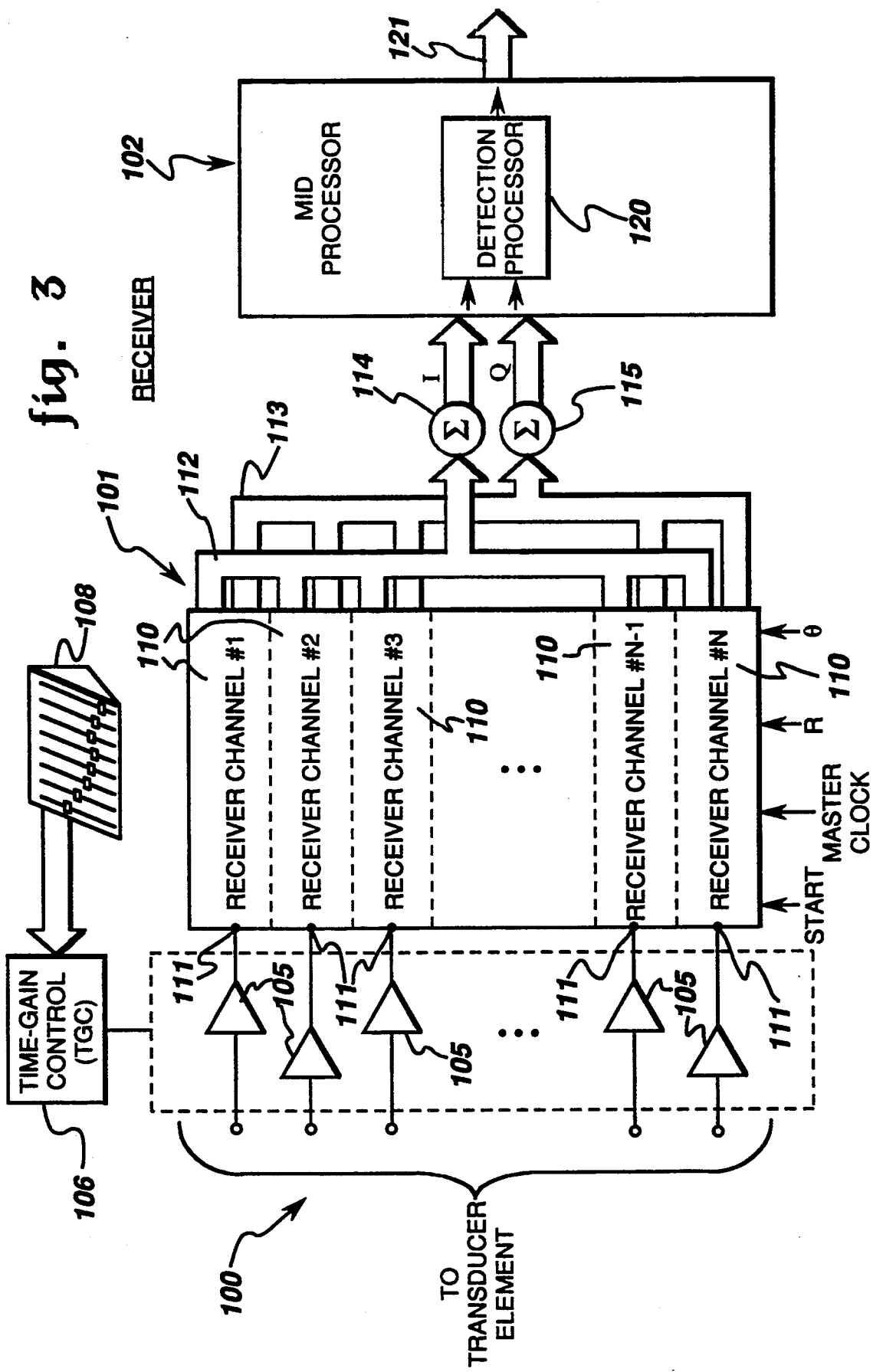
FIG. 3 is a block diagram of a receiver which forms part of the system of FIG. 1.

Referring particularly to FIG. 3 in conjunction with FIG. 1, receiver 14 is comprised of three sections: a time-gain control section 100, a beam forming section 101, and a mid processor 102. The time-gain control section 100 includes an amplifier 105 for each of the n=128 receiver channels and a time-gain control circuit 106. The input of each amplifier 105 is coupled to a respective one of the transducer elements 12 to receive and amplify the echo signal which it receives. The amount of amplification provided by amplifiers 105 is controlled by time-gain control circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the sector scan. The time interval over which the echo signal is acquired determines the range from which it emanates, and this time interval is divided into eight segments by TGC control circuit 106. The settings of the eight potentiometers are employed to set the gains of amplifiers 105 during each of the eight respective time intervals so that the echo signal is amplified in ever increasing amounts over the acquisition time interval.

The beam forming section 101 of the receiver 14 includes n=128 separate receiver channels 110. As will be explained in more detail below, each receiver channel 110 receives the analog echo signal from one of TGC amplifiers 105 at an input 111, and it produces a stream of digitized output values on an I bus 112 and a Q bus 113. Each of these I and Q values represents a sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam ($\theta$). In the preferred embodiment, each echo signal is sampled at equal intervals of about 150 micrometers over the entire range of the scan line (typically 40 to 200 millimeters).

For a more detailed description of receiver 14, reference is made to commonly assigned U.S. Pat. No. 4,983,970 issued Jan. 8, 1991, entitled "Method And Apparatus for Digital Phase Array Imaging", and which is incorporated herein by reference.

Referring still to FIG. 3, mid processor section 102 receives the beam samples from summing points 114 and 115. The I and Q values of each beam sample are 20-bit digital numbers representing the in-phase and quadrature components of the magnitude of reflected sound from a point (R,$\theta$). Mid processor 102 can perform a variety of calculations on these beam samples, where choice is determined by the type of image to be reconstructed. For example, if a conventional magnitude image is to be produced, a detection process indicated at 120 is implemented in which a digital magnitude M is calculated from each beam sample and output at 121 according to $$M = \sqrt{I^2 + Q^2} \ .$$

Figure 4:
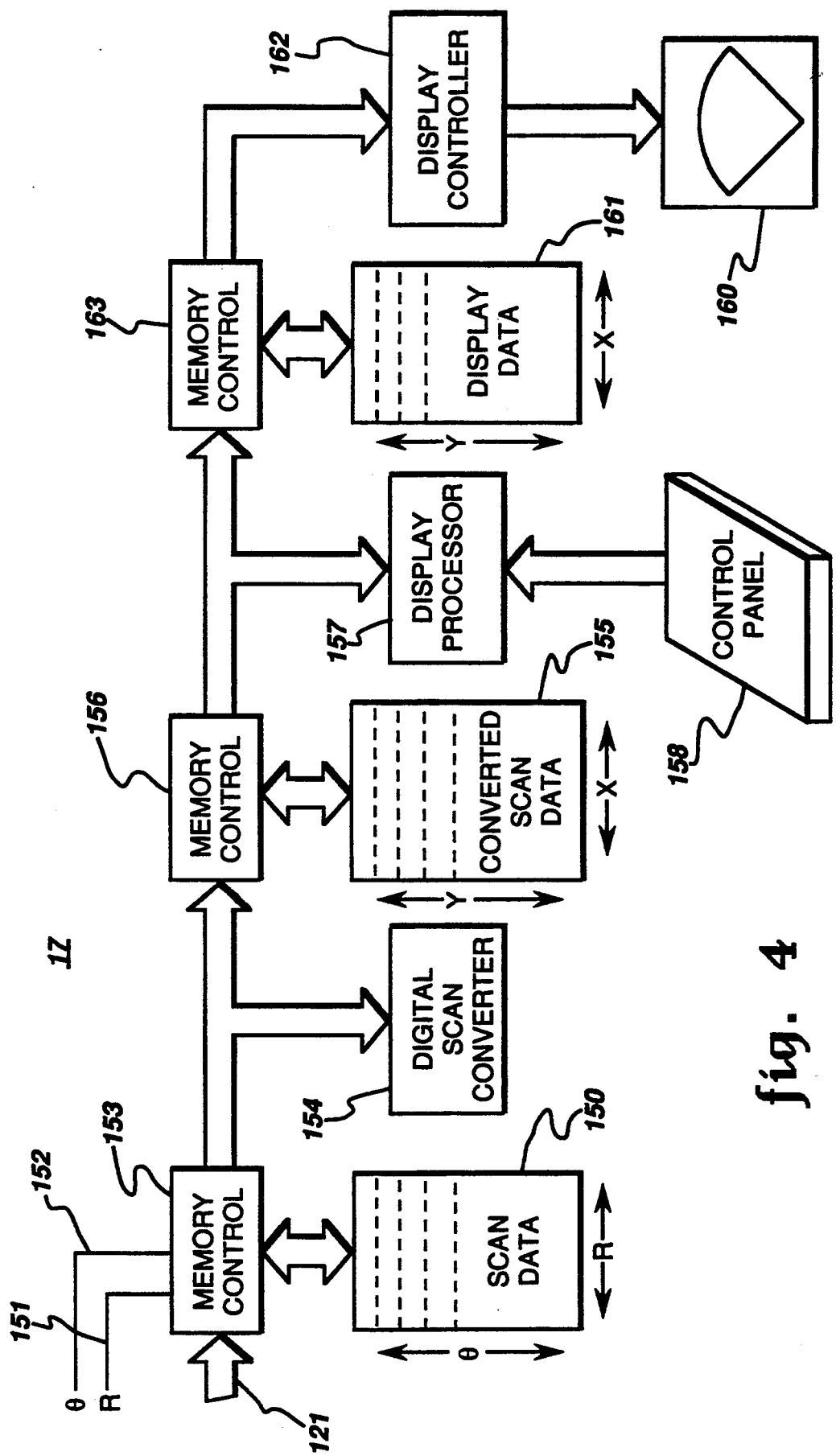
FIG. 4 is a block diagram of a display system which forms part of the system of FIG. 1.

Referring particularly to FIGS. 1 and 4, receiver 14 generates a stream of 8-bit digital numbers at its output 121 which is applied to the input of display system 17. This "scan data" is stored in a memory 150 as an array, with the rows of scan data array 150 corresponding with the respective beam angles ($\theta$) that are acquired, and the columns of scan data array 150 corresponding with the respective ranges (R) at which samples are acquired along each beam. The R and $\theta$ control signals 151 and 152 from receiver 14 indicate where each input value is to be stored in array 150, and a memory control circuit 153 writes that value to the proper memory location in array 150. The scan can be continuously repeated and the flow of values from receiver 14 will continuously update scan data array 150.

Referring still to FIG. 4, the scan data in array 150 are read by a digital scan converter 154 and converted to a form producing the desired image. If a conventional B-scan image is being produced, for example, the magnitude values M(R,$\theta$) stored in scan data array 150 are converted to magnitude values M (x, y) which indicate magnitudes at pixel locations (x,y) in the image. Such polar coordinate to Cartesian coordinate conversion of the ultrasonic image data is described, for example, by Steven C. Leavitt et al. "A Scan Conversion Algorithm for Displaying Ultrasound Images", *Hewlett-Packard Journal*, October, 1983, pp. 30–33.

Regardless of the particular conversion made by digital scan converter 154, the resulting image data are written to a memory 155 which stores a two-dimensional array of converted scan data. A memory control 156 provides dual port access to memory 155 such that digital scan converter 154 can continuously update the values therein with fresh data while a display processor 157 reads the updated data. Display processor 157 is responsive to operator commands received from a control panel 158 to perform conventional image processing functions on the converted scan data in memory 155. For example, the range of brightness levels indicated by the converted scan data in memory 155 may far exceed the brightness range of display device 160. Indeed, the brightness resolution of the converted scan data in memory 155 may far exceed the brightness resolution of the human eye, and manually operable controls are typically provided which enable the operator to select a window of brightness values over which maximum image contrast is to be achieved. The display processor reads the converted scan data from memory 155, provides the desired image enhancement, and writes the enhanced brightness values to a display memory 161.

Display memory 161 is shared with a display controller circuit 162 through a memory control circuit 163, and the brightness values therein are mapped to control the brightness of the corresponding pixels in display 160. Display controller 162 is a commercially available integrated circuit which is designed to operate the particular type of display 160 used. For example, display 160 may be a CRT (cathode ray tube), in which case display controller 162 is a CRT controller chip which provides the required sync pulses for the horizontal and vertical sweep circuits and maps the display data to the CRT at the appropriate time during the sweep.

It should be apparent to those skilled in the art that display system 17 may take one of many forms depending on the capability and flexibility of the particular ultrasound system. In the preferred embodiment described above, programmed microprocessors are employed to implement the digital scan converter and display processor functions, and the resulting display system is, therefore, very flexible and powerful.

Figure 5:
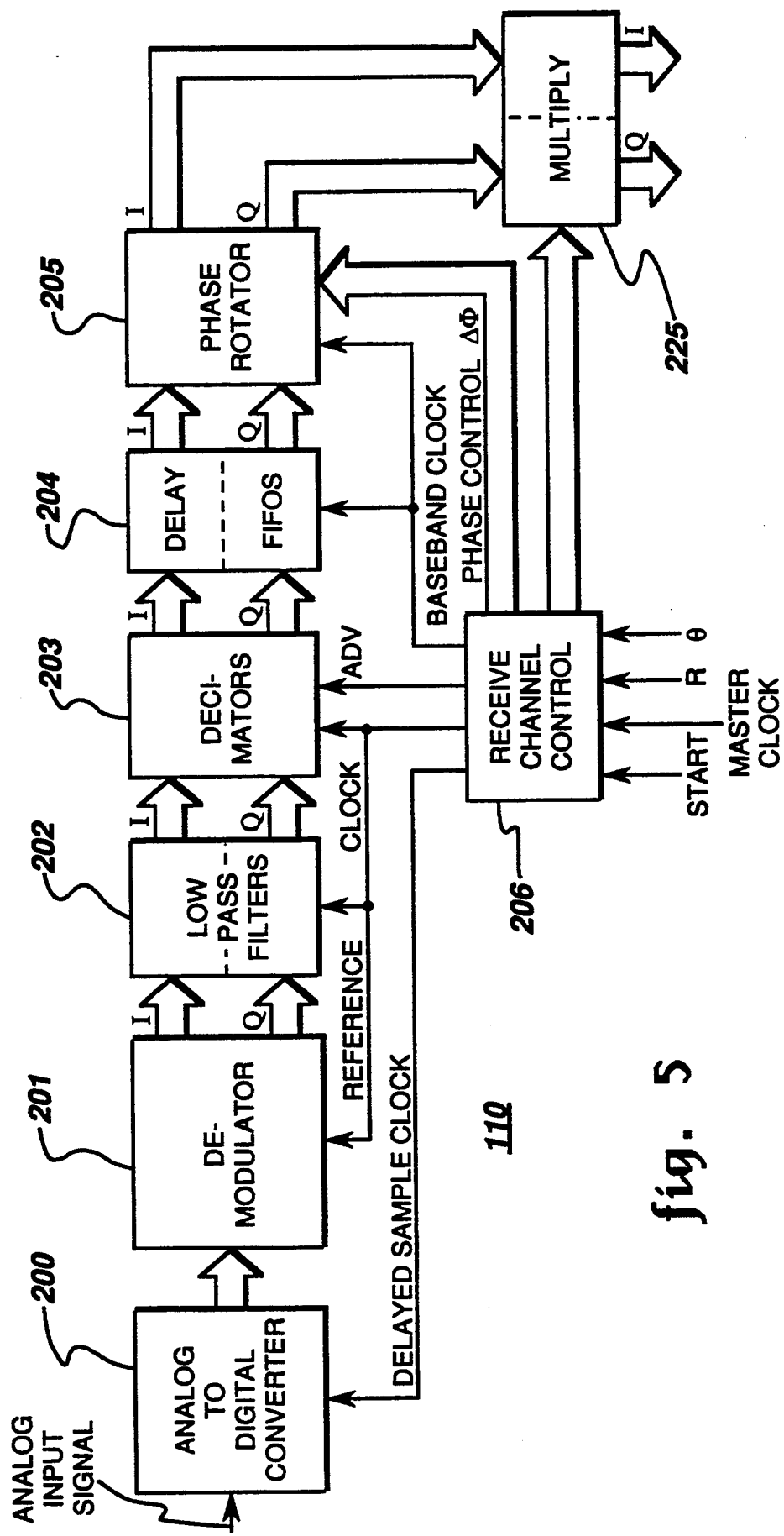
FIG. 5 is a block diagram of a receiver channel which forms part of the receiver of FIG. 3.

As indicated above with reference to FIG. 3, the beam forming section 101 of receiver 14 is comprised of a set of receiver channels 110—one for each element 12 of transducer 11 (FIG. 1). As shown in FIG. 5, each receiver channel 110 is responsive to a START command, a 40 MHz master clock, and a beam angle signal ($\theta$) from digital controller 16 (FIG. 1) to perform the digital beam forming functions. These include: sampling the analog input signal in an analog-to-digital converter 200, demodulating the sampled signal in a demodulator 201; filtering out the high frequency sum signals produced by demodulator 201 with low pass filters 202; reducing the data rate in decimators 203; and time delaying and phase adjusting the resulting digital data stream in delay FIFOs (i.e., first-in/first-out memories) 204 and phase rotator 205. All of these elements are controlled by a receive channel control 206 which produces the required clock and control signals in response to commands from digital controller 16 (FIG. 1). In the preferred embodiment all of these elements are contained on a single integrated circuit.

Figure 5A:
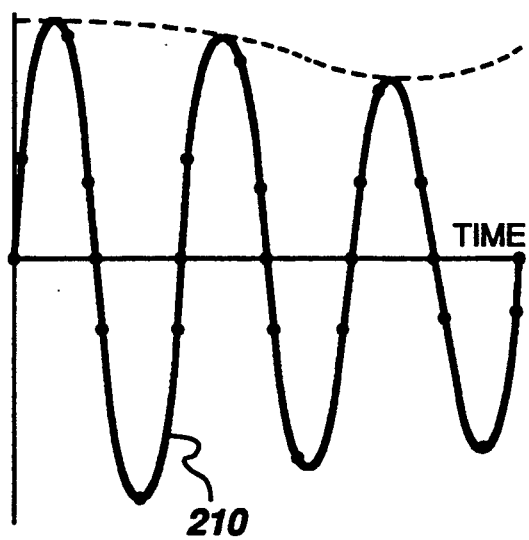
FIG. 5A–5E are graphical illustrations of the signal at various points in the receiver channel of FIG. 5.
Figure 5B:
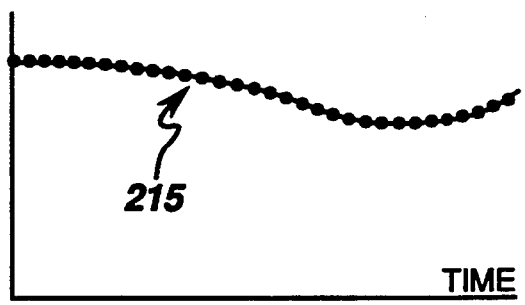

Referring still to FIG. 5, analog-to-digital converter 200 samples the analog signal, indicated graphically by waveform 210 in FIG. 5A, at regular intervals determined by the leading edge of a sample clock signal from receive channel control 206. In the preferred embodiment the sample clock signal is a 40 MHz clock and this enables the use of ultrasonic frequencies of up to 20 MHz without violating the Nyquist sampling criteria. When a 5 MHz ultrasonic carrier frequency is employed, for example, it is sampled eight times per carrier cycle and a 10-bit digital sample is produced at the output of the analog-to-digital converter at a 40 MHz rate. These samples are supplied to demodulator 201 which mixes each sample with both a reference that is in-phase with the transmitted ultrasonic carrier, and with a reference that is in quadrature with the transmitted ultrasonic carrier. The demodulator reference signals are produced from stored SINE and COSINE tables that are read out of their respective ROM memories by a 40 MHz reference clock signal from receive channel control 206. The COSINE value is digitally multiplied by the sampled input signal to produce a demodulated, in-phase value (I) signal which is supplied to a low pass filter 202, and the SINE value is digitally multiplied by the same sampled input signal to produce a demodulated, quadrature phase value Q signal which is supplied to a separate low pass filter 202. Low pass filters 202 are finite impulse response filters tuned to pass the difference frequencies supplied by demodulator 201, but block the higher, sum frequencies. As shown by waveform 215 in the graph of FIG. 5B, the output signal of each low pass filter is, therefore, a stream of 40 MHz digital values which indicate the magnitude of the I or Q component of the echo signal envelope.

For a detailed description of an analog-to-digital converter, demodulator, and a low pass filter circuit, reference is made to commonly assigned U.S. Pat. No. 4,839,652 which issued Jun. 13, 1989 and is entitled "Method and Apparatus For High Speed Digital Phased Array Coherent Imaging System."

Figure 5C:
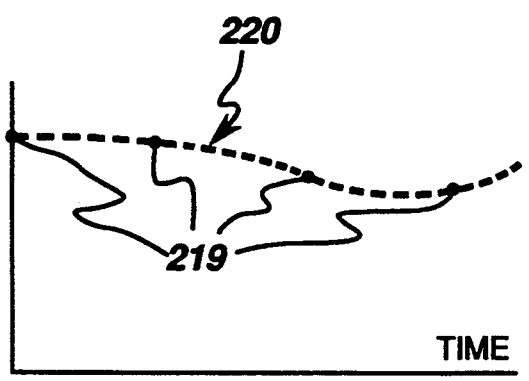

Referring still to FIG. 5, the rate at which the demodulated I and Q components of the echo signal are sampled is reduced by decimators 203. The 12-bit digital samples are supplied to the decimators at a 40 MHz rate which is unnecessarily high from an accuracy standpoint, and which is a difficult data rate to maintain throughout the system. Accordingly, decimators 203 select every eighth digital sample to reduce the data rate down to a 5 MHz rate. This corresponds to the frequency of a baseband clock signal produced by receive channel control 206 and employed to operate the remaining elements in the receiver channel. The I and Q output signals of decimators 203 are thus digitized samples 219 of the echo signal envelope indicated by dashed line 220 in the graph of FIG. 5C. The decimation ratio and the baseband clock frequency can be changed to values other than 8:1 and 5 MHz.

Figure 5D:
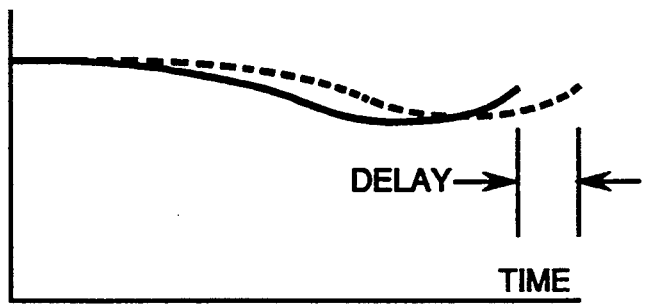

The echo signal envelope represented by the demodulated and decimated digital samples is then delayed by delay FIFOs 204 and phase shifted by phase rotator 205 to provide the desired beam steering and beam focusing. Delay FIFOs 204 are memory devices into which the successive digital sample values are written as they are produced by decimators 203 at a rate of 5 MHz. These stored values are written into successive memory addresses and then read from the memory device and supplied to phase rotator 205. The amount of initial delay, illustrated graphically in FIG. 5D, is determined by the difference between the memory location from which the digital sample is currently being supplied and the memory location into which the currently received digital sample is being stored. The 5 MHz baseband clock signal establishes 200 nanosecond intervals between stored digital samples and FIFOs 204 therefore provide a time delay measured in 200 nanosecond increments up to their maximum of 12.8 microseconds.

The time delay provided by delay FIFOs 204 is dynamically changed during receipt of the echo signal by advancing the data points sampled by decimators 203. Each advancement of the sampled data causes the data stream being supplied to the delay FIFOS 204 effectively to be delayed by an additional 25 nanoseconds (1/40 MHz). A sample advance control signal ADV from receive channel control 206 determines when each such advance should occur. This advancing occurs at calculated points during reception of the echo signal as disclosed in commonly assigned U.S. Pat. No. 5,230,340, issued Jul. 27, 1993, entitled "Ultrasound Imaging System With Improved Dynamic Focusing" and incorporated herein by reference.

Figure 5E:
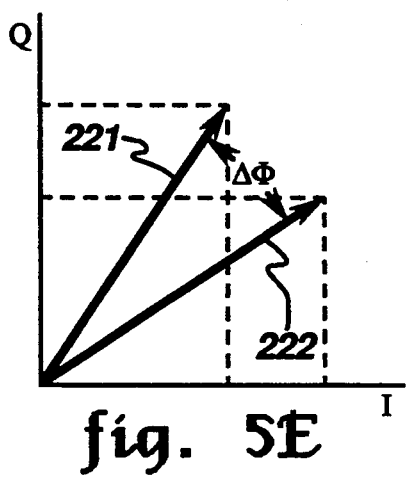

Phase rotators 205 enable the digitized representation of the echo signal to be phase rotated. The I and Q digital samples supplied to phase rotator 205 may be represented, as shown in FIG. 5E, by a phasor 221 and the rotated I and Q digital samples produced by phase rotator 205 may be represented by a phasor 222. The magnitudes of the phasors (i.e. the vector sum of the I and Q components of each) are not changed, but the I and Q values are changed with respect to one another such that the output phasor 222 is rotated by an amount $\Delta\phi$ from the input phasor 221. The phase can be either advanced ($+\Delta\phi$) or delayed ($-\Delta\phi$) in response to a phase control signal received on a bus from receive channel control 206. For a detailed description of phase rotator 205, reference is made to commonly assigned U.S. Pat. No. 4,896,287 which issued on Jan. 23, 1990 and is entitled "Cordic Complex Multiplier" and is incorporated herein by reference.

The I and Q outputs of phase rotator 205 are applied to the inputs of a pair of multipliers 225. The other input of each of multipliers 225 receives from receive channel control 206 an 8-bit window weighting factor ranging in value from 0.0 to 1.0. The I and Q outputs of multipliers 225 constitute the weighted receive channel output signals which are summed to form the receive beam.

For a general description of receiver channel 110 and a detailed description of how the I and Q outputs of each receiver channel 110 are summed together to form a beam signal, reference is also made to commonly assigned U.S. Pat. No. 4,983,970 which issued on Jan. 8, 1991 and is entitled "Method and Apparatus For Digital Phased Array Imaging", and is incorporated herein by reference.

Figure 6:
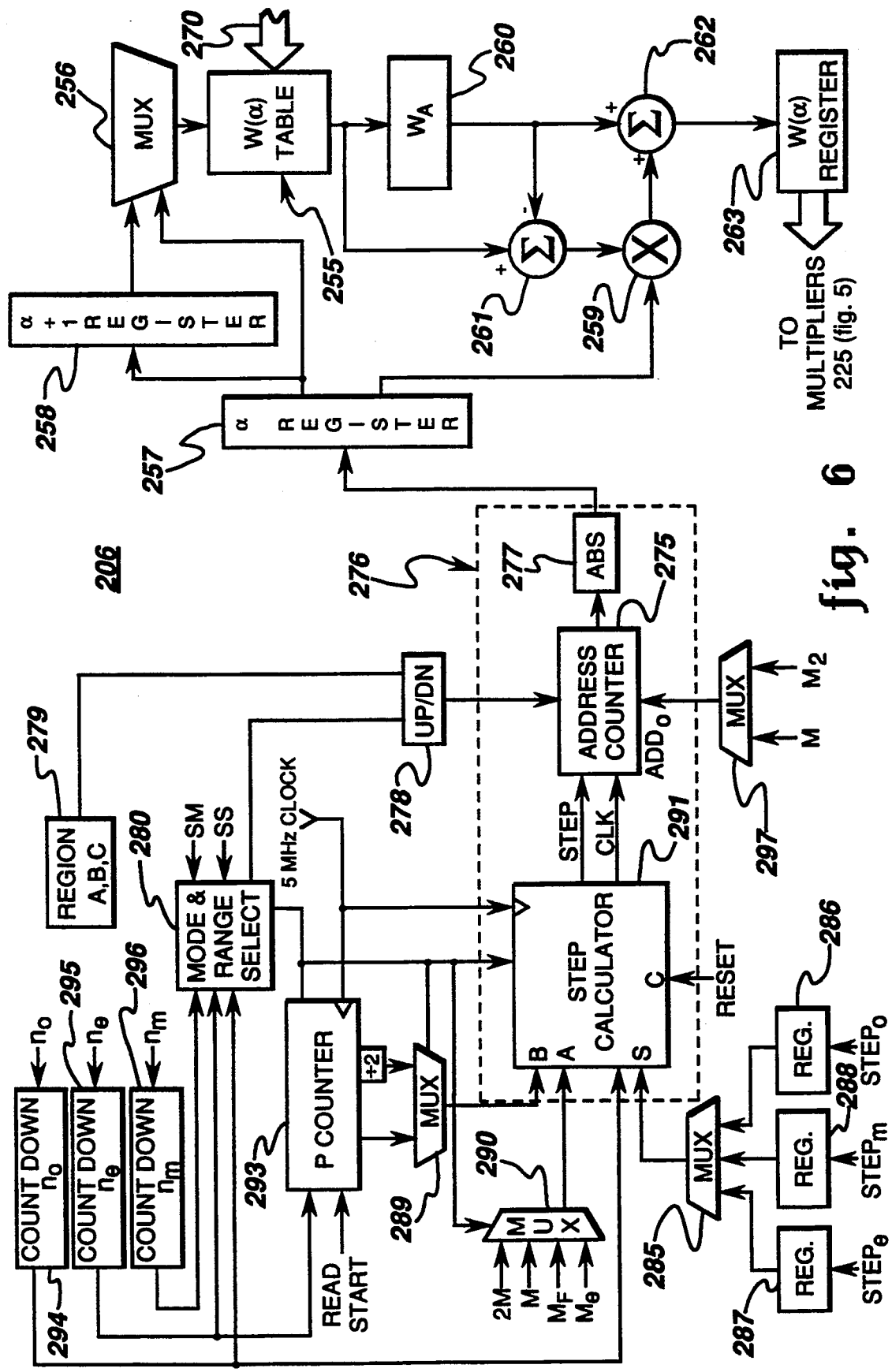
FIG. 6 is an electrical block diagram of a dynamic window circuit which forms part of the receiver channel of FIG. 5.

The improvement provided by the present invention is embodied in receive channel control 206 which is shown in more detail in FIG. 6. As indicated above, receive channel control 206 is a discrete logic circuit formed on a very large scale integrated circuit along with the other receiver channel elements shown in FIG. 5. Before explaining this circuit, the calculations which it performs will be described.

Figure 8:
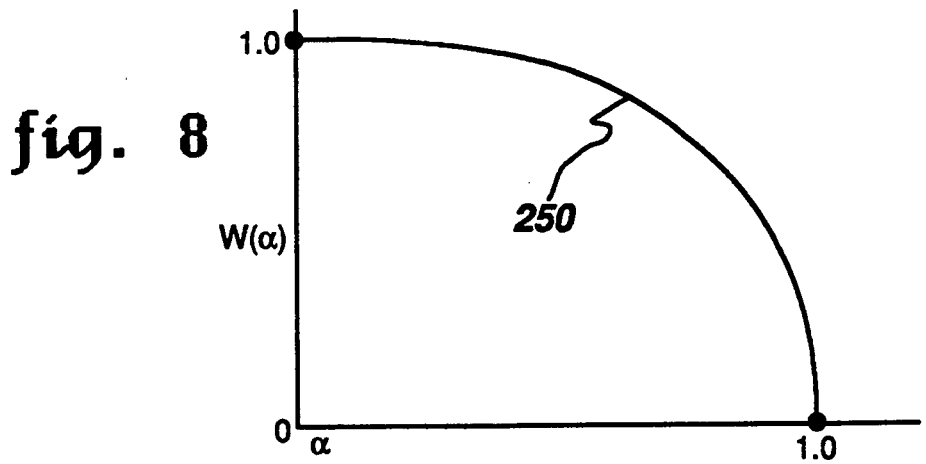
FIG. 8 is a graphical representation of a window function curve which is stored by the circuit of FIG. 6.

Referring particularly to FIG. 8, the objective of the present invention is to calculate for a particular receive channel whose transducer element 12 is located a distance $u_i$ from the center of the transducer array 11 (as shown in FIG. 1), a value for the window weighting factor $W(\alpha)$. This value ranges from 0.0 to 1.0 and is a function of the variable $\alpha$ as shown by curve 250. As will be described below, the data for window function curve 250 are stored as sixteen values at sixteen equally spaced values of $\alpha$ which ranges from 0.0 to 1.0. In the preferred embodiment described below, the value of $\alpha$ is calculated in real time by receive channel control 206 (FIG. 5) as the echo signal is being processed by the receive channel, and this is employed to determine the proper window weighting factor $W(\alpha)$ from the stored data for window function curve 250. The window weighting factor $W(\alpha)$ is supplied to multipliers 225 (FIG. 5) as described above to weight the echo signal samples being produced. For example, the transducer element located at distance $u_i$ from the center of the transducer array may lie outside the receive aperture early in the echo signal reception and its weighting factor $W(\alpha)$ is zero. As the receive aperture opens to include the transducer element at distance $u_i$ from the center of the transducer array, the value of $\alpha$ is 1.0, and as the receive aperture opens further, the value of $\alpha$ drops and the weighting factor $W(\alpha)$ increases along window function curve 250.

Figure 9:
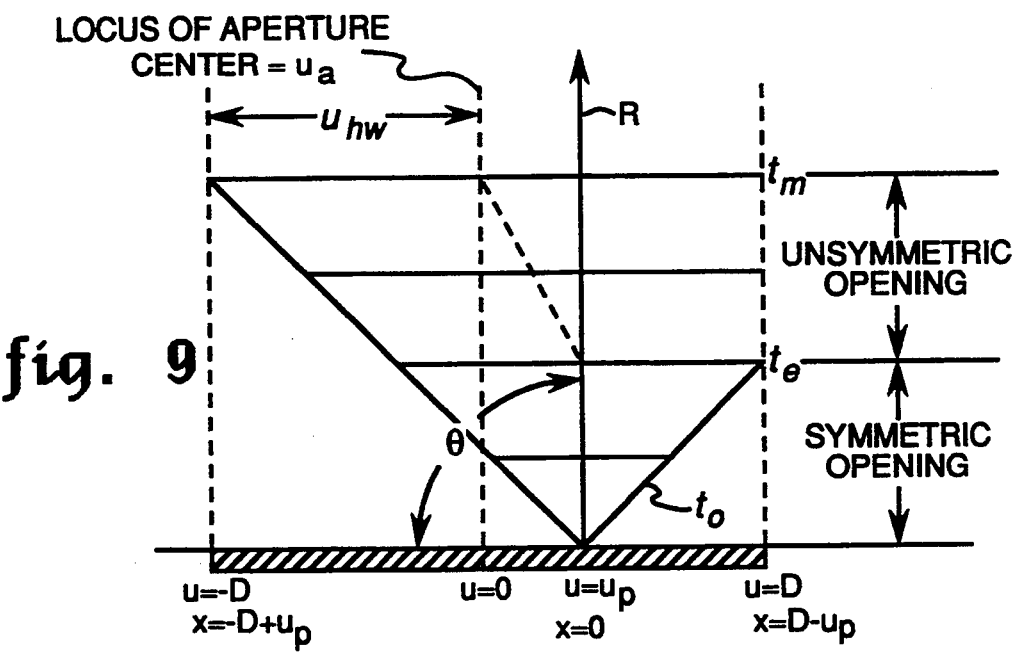
FIG. 9 is a graphical representation of the opening receive aperture and the various parameters that enter into determination of the window function weighting factor.

As shown in FIG. 9, the value of $\alpha$ required to locate the proper weighting factor $W(\alpha)$ on window function curve 250 of FIG. 8 at any moment in time is calculated as a function of a number of variables including time (t) and beam angle ($\theta$). The phase center ($u_p$) of transducer array 11 can be located anywhere along its length from $u=-D$ to $u=D$. The center of the receive aperture ($u_a$) will start at the phase center ($u_p$) and remain there during the symmetric opening stage until the nearest end of array 11 is reached at time $t=t_e$. The center of the receive aperture ($u_a$) will shift during the following unsymmetrical opening of the receive aperture and will end at the center of the transducer array ($u=0$) when the aperture is fully open at time $t=t_m$. The movement of the aperture center, during the unsymmetrical phase, occurs at one half the rate of the free edge. We can define an aperture half width as $u_{hw}(\theta,t)$ and the location of the aperture center $u_a(\theta,t)$. We wish to create a window centered on the aperture using, as the aperture equation:

$$W(\alpha) = W\left(\frac{|u_i - u_a(\theta,t)|}{u_{hw}(\theta,t)}\right). \tag{3}$$

To develop the aperture equation we need a number of important variables that are easily calculated. The first comes about through the realization that the geometric terms can be simplified by using an effective velocity $c_a$ as defined in equation (4). Also, the time that the near edge is struck is $t_e$, and the time the far edge is struck is $t_{in}$, defined as in equations (5) and (6), respectively. Following this line of reasoning there is one more time that is important, the "turn on" time $t_0$ of equation (7). Thus, equations (4)-(7) may be written as:

$$c_a = \frac{c/2}{2F\cos(\theta)} \tag{4}$$

$$t_e = \frac{D - |u_p|}{c_a} \tag{5}$$

$$t_m = \frac{D + |u_p|}{c_a} \tag{6}$$

$$t_0 = \frac{|u - u_p|}{c_a}. \tag{7}$$

It is more convenient to use a coordinate system with its center (x=0) at the phase center of the array. In such coordinate system, the aperture half width $x_{hw}$ can be represented as in equation (8) and the aperture center as in equation (9). The aperture opening rate is halved when the unsymmetrical phase is entered. This is emphasized by the form of the two expressions. In effect, one of the two t's in the parentheses of equation (8) remains unchanged as the unsymmetrical opening solution is entered. In the case of the aperture center location as defined in equation (9), the unsymmetrical phase of the solution shows that beyond time $t_e$ the aperture center location moves from the phase center to the array center. Throughout the solution the effective speed $c_a$, determined from equation (4), is the ratio between time and distance.

$$x_{hx}(\theta,t) = \begin{bmatrix} \frac{c_a}{2}(t + t) & t_0 \leq t \leq t_e \\ \frac{c_a}{2}(t_e + t) & t_e \leq t \leq t_m \\ \frac{c_a}{2}(t_e + t + [t - t_m]) & t_m \leq t \end{bmatrix} \tag{8}$$

The location of the aperture center, stated as $x_a$ relative to up, is either -up or up depending upon which side of the array the phase center is located.

$$x_a(\theta,t) = \begin{bmatrix} 0 & t_0 \leq t \leq t_e \\ \begin{bmatrix} -\frac{c_a}{2}(t - t_e), & u_p \geq 0 \\ \frac{c_a}{2}(t - t_e), & u_p < 0 \end{bmatrix} & t_e \leq t \leq t_m \\ \begin{bmatrix} -u_p, & u_p \geq 0 \\ u_p, & u_p \leq 0 \end{bmatrix} & t_m \leq t \end{bmatrix} \quad (9)$$

With the aperture equations (8) and (9) the argument ($\alpha$) of the window function in equation (3) is calculated. If the window is defined to be an array in memory, the arguments ($\alpha$) can be thought of as a table address function Add (t,x) that starts at some maximum table address M and runs to zero. The address function in equation (10) can then be defined in light of this convention. The address $$Add(t,x) \equiv M \frac{|x - x_a(t)|}{x_{hw}(t)} \quad (10)$$

uses the aperture equations and adds the location x of the particular transducer element for which the address function is defined. Of course there will be a separate value of equation (10) for each element in the transducer array. Operating together they provide the desired time varying aperture. Applying the aperture equations to equation (10) results in equation (11). Specifically, there is first the symmetric opening, where the solution depends upon 1/t. In the middle, the unsymmetrical opening has two solutions, depending upon whether the phase center of the array is to the left or to the right of the physical center of the array. It should be noted that x expresses the location of the element including negative values. Lastly, the virtual aperture opening after the time $t_m$ has two solutions as shown.

$$Add(t,x) = \begin{bmatrix} M \frac{|x|}{tc_a} & t_0 \leq t \leq t_e \\ \begin{bmatrix} M \frac{|x + (t - t_e)c_a/2|}{(t_e + t)c_a/2}, & u_p \geq 0 \\ M \frac{|x - (t - t_e)c_a/2|}{(t_e + t)c_a/2}, & u_p < 0 \end{bmatrix} & t_e \leq t \leq t_m \\ \begin{bmatrix} M \frac{|x + u_p|}{(2t + t_e - t_m)c_a/2}, & u_p \geq 0 \\ M \frac{|x - u_p|}{(2t + t_e - t_m)c_a/2}, & u_p \leq 0 \end{bmatrix} & t_m \leq t \end{bmatrix} \quad (11)$$

Equation (11) can be further simplified by substituting in the value of $t_0$ from equation (7). This removes the x term, but causes some increased complexity in keeping track of the sign of x as is shown in equation (12). The four solutions for the unsymmetrical opening stage arise out of the need to consider the sign of x in the numerator. Also, the expression can be simplified by solving equations (5) and (6) for up as a function of $t_m$ and $t_e$. Likewise for the fully open array a similar set of solutions are required. By use of the absolute value in the numerator and a variable defined as R in equation (13), the four solutions in the second and third time intervals can be reduced to single solutions indicated in equation (14). Equation (13) is simplified using the "sign of" function, sgn(). The regions A, B and C and 1-4 indicated in equations (13) and (14) are shown in the graphical representation of the opening receive aperture illustrated in FIG. 10.

$$Add(t,x') = \begin{matrix} M \frac{t_0}{t} & t_0 \geq t \geq t_e \\ M \frac{|2t_0 + (t - t_e)|}{(t_e + t)}, & x \geq 0, u_p \geq 0 \\ M \frac{|-2t_0 + (t - t_e)|}{(t_e + t)}, & x \leq 0, u_p \geq 0 \\ M \frac{|2t_0 - (t - t_e)|}{(t_e + t)}, & x \geq 0, u_p \geq 0 \\ M \frac{|-2t_0 - (t - t_e)|}{(t + t_e)}, & x \leq 0, u_p \leq 0 \\ [\quad] \\ M \frac{|t_0 + (t_m - t_e)/2|}{t + (t_e - t_m)/2}, & x \geq 0, u_p \geq 0 \\ M \frac{|t_0 - (t_m - t_e)/2|}{t + (t_e - t_m)/2}, & x \leq 0, u_p \geq 0 \\ M \frac{|t_0 - (t_m - t_e)/2|}{t + (t_e - t_m)/2}, & x \geq 0, u_p \leq 0 \\ M \frac{|t_0 + (t_m - t_e)/2|}{t + (t_e - t_m)/2}, & x \leq 0, u_p \leq 0 \\ [\quad] \end{matrix} \begin{matrix} t_e \leq t \leq t_m \\ \\ \\ \\ \\ t_m \leq t \end{matrix} \quad (12)$$

$$R = \begin{bmatrix} 1, & x \geq 0, & u_p \geq 0, & \text{Region} = A \\ -1, & x \leq 0, & u_p \geq 0, & \text{Region} = B,C \\ -1, & x \leq 0, & u_p \leq 0, & \text{Region} = B,C \\ 1, & x \leq 0, & u_p \leq 0, & \text{Region} = A \end{bmatrix} = \text{sgn}(x)\text{sgn}(u_p) \quad (13)$$

$$Add(t,x) = \begin{bmatrix} M\dfrac{t_0}{t} & t_0 \leq t \leq t_e, & \text{Region} = 1 \\ M\dfrac{|R2t_0 + (t - t_e)|}{(t_e + t)} = M\left|\dfrac{2(t_e - R\, t_0)}{(t_e + t)} - 1\right| & t_e \leq t \leq t_m, & \text{Region} = 2,3 \\ M\dfrac{|t_0 + R(t_m - t_e)/2|}{t + (t_e - t_m)/2} & t_m \leq t, & \text{Region} = 4 \end{bmatrix} \quad (14)$$

These expressions for the address of the window function are in the most usable form for the dynamic calculation of the address. During the first stage of symmetric aperture opening the table address changes as $Mt_0/t$. During the second stage, which is an unsymmetric opening stage, the address changes as a function of $1/t$, but with a delay. This delay can be accommodated by an offset bias added to the solution, as will be discussed below. Finally, in a third stage, after full aperture opening, the virtual aperture may continue to open symmetrically centered on the transducer array physical center. The solutions in the unsymmetric opening stage and virtual aperture opening stage depend upon the variable R given by equation (13).

Figure 10:
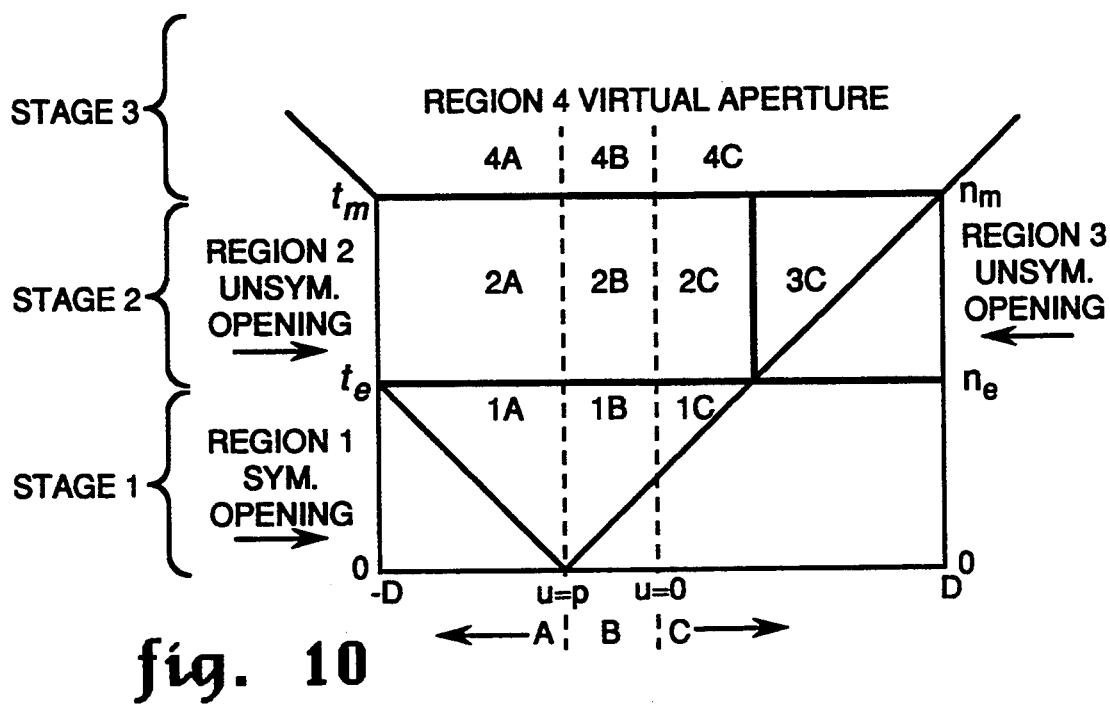
FIG. 10 is a graphical representation of the opening receive aperture showing the various regions that require different consideration during the dynamic window determination.

As shown in FIG. 10, the transducer array has its phase center $u_p$ located to the left of the physical center u of the array. For this geometry the near edge of the transducer array is "struck" by the left side of the opening aperture to define the time $t_e$. As aperture opening continues, the far edge of the transducer array is struck, defining the time $t_m$. For the phase center on the right, a mirror image of FIG. 10 applies.

Equations (14) are calculated dynamically during the receipt of the echo signal by each receive channel control 206 (FIG. 5). These dynamic calculations are performed by the dynamic window circuit of FIG. 6, and the resulting window weighting factors which it produces are applied to multipliers 225 (FIG. 5) as described above. Since for each receive channel the location x of its transducer element is fixed and the phase center ($u_p$) for each firing is fixed, many of the calculations are performed by digital controller 16 (FIG. 1) prior to the firing and downloaded to the dynamic window circuit as described below.

Referring particularly to FIG. 6, sixteen data points on window function curve 250 (FIG. 8) are stored in a W($\alpha$) table 255. It is these table values which are addressed by equation (14). A 4-bit address is applied to table 255 by a multiplexer (MUX) 256 which receives as input signals the four most significant bits from an $\alpha$ register 257 and four bits from an $\alpha+1$ register 258. This register is also supplied with the four most significant bits of $\alpha$ from register 257. During one clock pulse a value $W_A = W(\alpha)$ is addressed by MUX 256, and during the next clock pulse, the next value $W_B = W(\alpha+1)$ in table 255 is addressed. The least significant bits (0–3) stored in register 257 are applied to a multiplier 259, and the value (k) represented by these four bits interpolates between the two table values $W_A$ and $W_B$ in accordance with the following:

$$W(\alpha) = W_A + k(W_B - W_A) \quad (15)$$

A register 260 stores the first table value $W_A$ while the second table value $W_B$ is read out and applied to a summer 261. This first table value $W_A$ is then added to the output signal of multiplier 259 by a summer 262 and subtracted from the value $W_B$ in summer 261, the output signal of which is multiplied by the value (k) by multiplier 259 and supplied to summer 262. The resulting 8-bit window function weighting factor W($\alpha$) is stored in a register 263 and from there is applied to multiplier 225 (FIG. 5) as described above.

It can be appreciated that as the echo signal is received, the value of $\alpha$ in register 257 is changed in accordance with equation (14) to dynamically alter the window function weighting factor W($\alpha$) interpolated from the values stored in table 255. While only sixteen values are stored in W($\alpha$) table 255 and linear interpolation is used to provide an additional four bits of resolution, an alternative embodiment is to store 240 values in table 255 and address them with all eight bits of $\alpha$ register 257. The interpolation approach is preferred because it reduces the amount of data to be downloaded to table 255 through a bus 270 from the system memory (which is part of digital controller 16 shown in FIG. 1) if the window function curve is changed.

Referring still to FIG. 6, the value of $\alpha$ at any moment is generated by an address counter 275 which forms part of a shading advance circuit (SAC) 276. The count in address counter 275 ranges from $-239$ to $+239$, and an absolute value circuit 277 converts the count to an absolute value of from 0 to 239 which is stored in $\alpha$ register 257. The count in address counter 275 is increased or decreased by a "step" when a clock signal (CLK) is received. The direction of this step (i.e. up or down the address count) is determined by an input signal (L) from an up/down controller 278, which receives as its input signal the downloaded region information (A, B or C) from the memory in controller and system memory 16 and a 2-bit mode signal from a mode and range select circuit 280. Address counter 275 is initialized with a value M as indicated in FIG. 11, at the start of region 1, through a multiplexer 297. At the start of region 2, address counter 275 is reinitialized with a precalculated value M2 through multiplexer 297, where $$M_2 = M\left(1 - \dfrac{n_e - n_o}{n_e}\right)$$

as given in FIG. 11 for the address. $M_2$ represents the address at the start of region 2A.

As the echo signal is received and the aperture opens in the stages discussed above with reference to FIG. 7B, the value in address counter 275 is moved along the window function curve 250 (FIG. 8) in amounts indicated by the STEP input signal. Mode and range select circuit 280 indicates at what stage the aperture opening is in at any moment during the receive process, based on input signals from counters 294, 295 and 296, and mode signals SM and SS. The controller 16 may function in various modes since if SM is set, the controller will function as if it remains in symmetric region 1 of FIG. 10 and if SS is set, the controller stops any action in region 3 of FIG. 10.

The circuit of FIG. 6 is initialized at the start of each beam firing by values downloaded from digital controller 16 (FIG. 1). These include values $n_o$, $n_e$ and $n_m$ which represent the respective times $t_o$, $t_e$ and $t_m$ measured in counts of the 5 MHz range clock. These values are stored in counters 294, 295 and 296, respectively, and provide indications of the various phases of aperture opening. Initial values $STEP_e$, $STEP_m$ and $STEP_o$ are downloaded to registers 286, 287 and 288, respectively, and applied to respective inputs of a multiplexer 285. The output of multiplexer 285 is coupled to one input S of a step calculation circuit 291 which is initialized with one of the step values at the beginning of each stage of aperture opening as will be described below. Similarly, memory address values $M_e$, $M_f$, M and 2M, required at different stages of aperture opening, are also calculated and downloaded to the circuit of FIG. 6. These are applied to respective inputs of a multiplexer 290 and the output signal of multiplexer 290 constitutes one of the initial address values provided to an A register in step calculator 291.

A B register in step calculator 291 is initialized at the beginning of each stage of aperture opening with the signal value from an up counter for the value P (the counter being designated a P counter 293) or half the value in P counter 293, through a multiplexer 289. P counter 293 starts at a value "READ START" and its count is increased by the 5 MHz range clock during the receive process. (The term "P" is defined in equation (19) below.)

Shading advance circuit 276 solves the above equations (14) to apply table addresses $\alpha$ to register 257. Circuit 276 solves a single equation of the form in equation (16), $$f(y) = H + LG/y \tag{16}$$

but is initialized at the beginning of each stage with values that enable it to solve for the particular situation.

In equation (16), the function f(y) has been given an offset value H, a sign value L, and scale factor G. The offset value H is the steady state value for f(y) when y becomes very large. The sign value L takes on the values of plus or minus one, while G is a scaling constant that is always positive. The free variable y is associated with integer values of time and f(y) is associated with an integer table address. The solution of equation (16) starts at the value $y_1$ and proceeds forward in y.

The initial value of f(y) at $y = y_1$ is as follows:

$$f(y_1) = H + LG/y. \tag{17}$$

The change in f(y) from $y_1$ onward is given in equation (18) as the initial value plus L times the function of $\alpha f$. The function $\alpha f$ in equation (18) is defined as the difference in the y term from start up to the current value of y. This term $\alpha f$ is set equal to $-P$, which is the assumed amount that f has changed since start-up at $y_1$.

$$f(y) = f(y_1) + L\Delta f \tag{18}$$

$$\Delta f = -\frac{G}{y_1} + \frac{G}{y} = -P \tag{19}$$

Equation (19) is solved by assuming that $y = y_1 + \Delta y$ and expanding to the following equation:

$$-\frac{G}{y_1} \Delta y + P(y_1 + \Delta y) = 0 \tag{20}$$

In effect, equation (20) contains the solution of equation (19) in a different form. It is solved by setting a value for P and then by trying progressively larger trial values of $\Delta y$. Eventually the expression will cross through zero, indicating that the particular target value of P is satisfied. A new target value for P is then set and even larger values of $\Delta y$ are tested. Each successful test indicates that $\Delta f$ can be advanced in value. In summary, shading advance circuit 276 operates by setting P, and trying values of $\Delta y$ at which $\Delta f$ will be advanced.

Shading advance circuit 276 is initialized with values for four variables A, B, C and S. The first is which contains the "current value" of the test and is given in equation (21). This value C is incremented on either P or $\Delta y$ in equations (22) and (23). The increment of P is by the amount S, while the increment on $\Delta y$ is by unity. The reason for the increment by S is the need to move the solution along more rapidly. Equation (22) defines the variable B, and equation (23) defines the variable A.

$$C(\Delta y, P) \equiv Py_1 - \Delta y \left( \frac{G}{y_1} - P \right) = P(y_1 + \Delta y) - \Delta y \frac{G}{y_1} \tag{21}$$

$$C(\Delta y, P + S) = C(\Delta y, P) + S(y_1 + \Delta y) \equiv C(\Delta y, P) + SB \tag{22}$$

$$C(\Delta y + 1, P) = C(\Delta y, P) - \left( \frac{G}{y_1} - p \right) \equiv C(\Delta y, P) - A \tag{23}$$

The procedure executed by shading advance circuit 276 to solve the generalized equation is given in Table A using pseudo code. The procedure begins with an initialization for C, A, B, and S. Also the address counter value, (which is f(y)) is pre-incremented by an amount PreInc, which is one-half the value of step S. The recession comprises incrementing C by moving on $\Delta y$, as in equation (23), until the value of C goes negative. At this point, count F in address counter 275 (FIG. 6) is incremented by the other half of the required step (PostInc). Also at this time a new target value is set by adjusting C with an increment on P, as in equation (22), and to pre-increment F by a new PreInc amount. The split-incrementation, or step, in address counter 275 straddles the answer and reduces the error.

TABLE A

S = 2_to_the( trunc(
1 + ln($S_{min}$)/ln(2)))
POST_INC = 0

TABLE A-continued

```
ADD = ADD₀
A = (G/y₁)
B = y₁
C = 0
Flag = 0
do {
        if (rclock == 1)
        {
                C = C - A
                B = B + 1
                if( (C <= 0) and (A - S > 0))
                {
                        Flag = 0
                        A = A - S
                        C = C + (S*B)
                        ADD = ADD—
                                (L*POST_INC/2)
                        POST_INC = S
                        ADD = ADD - (L*S/2)
                }
                else
                {
                        if ((Flag = 1) and
                        S > 1))
                        {
                                S = S/2
                        }
                        Flag = 1
                }
        }
}
```

Shading advance circuit 276 (FIG. 6) computes the proper address function according to equation (14) when it is properly initialized with values that reflect the location of the array element, the location of the phase center and the stage of aperture opening. This initialization is indicated by the table in FIG. 11. Referring to FIGS. 10 and 11, for each of the applicable regions indicated in the first column of FIG. 11, shading advance circuit 276 of FIG. 6 is initialized with the values indicated in the other columns of the chart. The second column indicates the time at which each initialization occurs at the successive stages of aperture opening. These times are downloaded to counters 294–296 as shown in FIG. 6, and the indicated values are loaded into the A, B, C and S registers of step calculator 291 (FIG. 6) at the beginning of each new phase. Also as indicated in FIG. 6, address counter 275 is initialized as indicated in FIG. 11 and whether the address counter 275 is incremented or decremented is indicated by the sign of 1 in the column labeled "L". The shading advance circuit thus provides a general purpose calculation which can be used to solve equation (14) for all the regions A, B and C indicated in FIG. 10 and at all of the aperture opening stages. These solutions are indicated in the last column of FIG. 11.

While only certain preferred features of the invention have been illustrated and described herein, many modifications and changes will occur to those skilled in the art. For example, while the system has been described in terms of an imager employing 128 transducer elements, the system may use more or fewer elements than 128. Moreover, while the system has been described in terms of a single row of a linear array of transducer elements, the invention is not restricted to such structure but may instead employ multiple rows of transducer elements with the use of appropriate parameters in accordance with the physical structure of the system. As yet another alternative, a curved array of transducers may be employed. It is, therefore, to be understood that the appended claims are intended to cover all such modifications and changes as fall within the true spirit of the invention.

What is claimed is:

1. An ultrasonic imaging system comprising:
    an ultrasonic transducer array having a set of array elements disposed in a pattern and each being separately operable to produce a pulse of ultrasonic energy through a medium during a transmission mode and to produce an echo signal in response to ultrasonic energy impinging thereon during a receive mode;
    a transmitter coupled to the ultrasonic transducer array and operable during the transmission mode to apply a separate signal to predetermined array elements such that a steered transmit beam is produced by the array;
    a receiver coupled to the ultrasonic transducer array and operable during the receive mode to sample the echo signal produced by selected array elements as the ultrasonic energy impinges thereon and to form a receive beam signal therefrom by separately delaying and summing the respective echo signals sampled from each array element, the receiver having channels that operate to modify the sampled echo signals produced by the transducer array elements with a window function weighting factor as the echo signals are received, each receive channel control circuit further including:
        memory means for storing a set of window function curve values at successive memory address locations;
        address counter means for producing an address useable by the memory means to produce the window function weighting factor from the stored set of window function curve values; and
        calculating means for advancing the address counter means as a function of time as the echo signal is being received; and
    a display system coupled to receive the receive beam signal and produce an image therefrom.

2. The ultrasonic imaging system as recited in claim 1 in which the memory means includes interpolation means for producing the window function weighting factor having a value that is intermediate values stored at successive memory addresses.

3. The ultrasonic imaging system as recited in claim 1 in which the calculating means advances the address counter means during a symmetric first stage in accordance with a relationship:

$$Add(t,x) = M \frac{|x - x_a(t)|}{x_{hw}(t)}$$

where t is time, x is distance from the center of the transmit beam, M is the maximum address in the memory means, $x_a$ is the location of the center of a receive aperture of the array and $x_{hw}$ represents the aperture half width.

4. The ultrasonic imaging system as recited in claim 3 in which the calculating means advances the address counter means during an unsymmetric second stage in accordance with a relationship:

$$\begin{bmatrix} M\dfrac{|x + (t - t_e)c_a/2|}{(t_e + t)c_a/2}, & u_p \geqq 0 \\ M\dfrac{|x - (t - t_e)c_a/2|}{(t_e + t)c_a/2}, & u_p < 0 \end{bmatrix}$$

where $t_e$ is the time at which the first symmetric stage ends, $c_a$ is a constant proportional to speed of the ultrasonic energy in the medium, and $u_p$ is a phase center location of the transducer array.

5. The ultrasonic imaging system as recited in claim 4 in which the calculating means advances the address counter means during an unsymmetric third stage in accordance with a relationship:

$$\begin{bmatrix} M\dfrac{|x + u_p|}{(2t + t_e - t_m)c_a/2}, & u_p \geqq 0 \\ M\dfrac{|x - u_p|}{(2t + t_e - t_m)c_a/2}, & u_p \leqq 0 \end{bmatrix}$$

where $t_m$ is the time at which a receive aperture of the array is fully open.

6. The ultrasonic imaging system as recited in claim 1 in which the calculating means has three stages of operation, and during each stage, the address counter means is advanced as a function of time in accordance with a different relationship, respectively.

7. The ultrasonic imaging system as recited in claim 6 in which the calculating means advances the address counter means during a second asymmetric stage in accordance with a relationship:

$$M\dfrac{|x \pm (t - t_e)c_a/2|}{(t_e + t)c_a/2}$$

where M is the maximum address in the memory means, x is the distance of the array element being sampled from the center of the transmit beam, t is time, $t_e$ is the time at which the second asymmetric stage begins, and $c_a$ is a constant proportional to speed of the ultrasonic energy in the medium.

8. The ultrasonic imaging system as recited in claim 6 in which the calculating means advances the address counter means during a third stage in accordance with a relationship:

$$M\dfrac{|x \pm u_p|}{(2t + t_e - t_m)c_a/2}$$

where M is the maximum address in the memory means, $|x \pm u_p|$ is the distance of the array element being sampled from the center of the transmit beam, t is time, $t_e$ is the time at which the second asymmetric stage begins, $t_m$ is the time at which the third stage begins, and $c_a$ is a constant proportional to speed of the ultrasonic energy in the medium.

* * * * *